Nov. 10, 1931.   M. CHARLES   1,830,869
AUTOMATIC DILATATION COMPENSATOR
Filed July 19, 1930
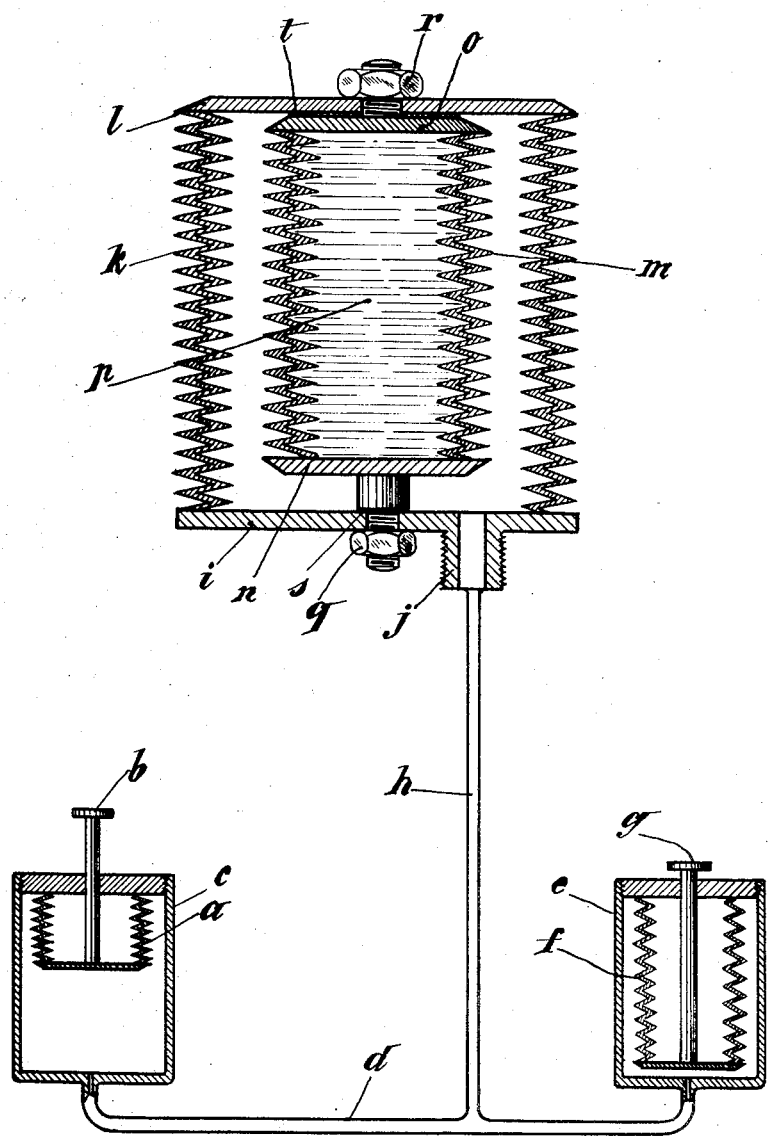

Patented Nov. 10, 1931

1,830,869

UNITED STATES PATENT OFFICE

MAURICE CHARLES, OF COURBEVOIE, FRANCE

AUTOMATIC DILATATION COMPENSATOR

Application filed July 19, 1930, Serial No. 469,243, and in France August 14, 1929.

In any hydraulic transmission comprising a cylinder filled with liquid, and a piston in said cylinder submitted to the displacements of the liquid, the position of the piston at rest is not always the same, but constantly varies according to the variations of temperature which act on the liquid by provoking its dilatation or its contraction.

My invention has for its object an automatic dilatation compensator which is intended to obviate the above mentioned drawback. Said compensator comprises a box or chamber having a variable volume connected to the transmission and within which is mounted another box, or chamber, also having a variable volume and containing a liquid preferably more dilatable than that of the transmission. Said boxes have their end walls rigidly secured to each other respectively so that the compensation takes place through the variation of volume of the annular space comprised between the two boxes, said variation depending on the deformation of the inner box, the whole of the compensating device being of course submitted to the same variations of temperature as the transmission circuit itself.

My invention will be described with reference to the appended drawing in which the figure is a diagrammatic section of the dilatation compensating device as applied to a hydraulic transmission similar to that described in my patent application Serial No. 35,740, filed June 8, 1925.

A bellows $a$ operated through a rod $b$ can drive out through pipe $d$ into a cylinder $e$ the liquid contained in a cylinder $c$.

Bellows $f$ which is contained in said cylinder $e$ is flattened by the action of the liquid and drives out a rod $g$ of a quantity equal to that by which rod $b$ has been driven in.

Now, it is obvious that the relative positions of rods $b$ and $g$ will vary with the temperature. In order to keep constant the relative positions of said rods, a pipe $h$ is connected to pipe $d$ at any suitable point, said pipe $h$ leading to the automatic dilatation compensator.

Said compensator comprises a top plate $i$ connected through a connection $j$ with pipe $h$, a bellows $k$ similar to that described in my patent application Serial No. 35,740, filed June 8, 1925, or having any suitable form, and a plate $l$, the whole constituting a fluid-tight box.

Within said bellows is located another bellows $m$ with end plates $n$ and $o$, which contains a liquid $p$, more dilatable than the liquid flowing through the hydraulic transmission. Plates $n$ and $o$ are respectively connected to plates $i$ and $l$ by means of threaded rods provided with nuts $q$ and $r$. Two joints $s$ and $t$ ensure the tightness of the system.

The space between the two bellows is completely filled with the same liquid as flows in transmission circuit and the apparatus is located in a place where it is submitted to the same variations of temperature as the transmission circuit.

In these conditions if the ambient temperature rises the liquid $p$ will expand, thus producing a lengthening of bellows $m$, which moves with it bellows $k$. The volume of the space comprised between bellows $k$ and bellows $m$ increases and it is possible to calculate the dimensions of these two bellows in such manner that the increase in volume may be equal to the increase in volume of the circuit, including the volume of the space between said two bellows, resulting from the rise of temperature.

Everything will then go on as if the volume of the circuit had not varied, and the same reasoning is good in the case of a fall of the temperature.

Besides, if the system be considered while working, there is a certain pressure in the pipes which is transmitted to the space inside bellows $k$, so that the end plate $l$ of said bellows is submitted to an effort which tends to lengthen said bellows.

But, on the other hand, as the end plates of the bellows are rigidly attached to each other respectively, a lengthening of bellows $k$ would involve a lengthening of bellows $m$ and the pressure of the liquid between bellows $k$ and $m$, that is outside bellows $m$, exerts an effort which opposes such a lengthening of bellows $m$. It will readily be understood that it is possible to calculate the dimensions of said two bellows in such manner that these efforts may exactly annul each other.

As examples of the liquids used in the system I may cite alcohol and ether.

Although I have described what I deem to be the preferred form of my device, I do not wish to be limited thereto, as there might be changes made in the construction, disposition and form of the parts without departing from the spirit of my invention.

Furthermore, the application of this system is not limited to hydraulic transmission. It could for instance be applied to any liquid tank, so as to keep its level constant whatever be the variations of temperature.

What I claim is:

1. A dilatation compensator for always keeping a constant volume of liquid in an inclosed space which comprises a longitudinally extensible chamber connected to said space, another longitudinally extensible chamber inclosed in the first one and filled with a liquid which has a greater coefficient of expansion than the aforesaid liquid, and means for rigidly securing the ends of said chambers respectively together.

2. A dilatation compensator for always keeping a constant volume of liquid in an inclosed space which comprises a box having extensible sides and rigid ends connected to said space, another box inclosed in the first one also having extensible sides and rigid ends filled with a liquid which has a greater coefficient of expansion than the aforesaid liquid and means for rigidly securing the ends of said boxes respectively together.

3. A dilatation compensator for keeping a constant volume of liquid in the circuit of a hydraulic transmission system, which comprises a bellows, two end plates mounted on said bellows forming a chamber, a pipe for connecting the inside of said bellows to the circuit of the hydraulic transmission system, another bellows inclosed in the first one, two end plates mounted on said last mentioned bellows so as to form another chamber which is filled with a liquid which has a greater coefficient of expansion than the liquid of the hydraulic transmission system, and means for rigidly securing the end plates of said chambers respectively together.

4. A dilatation compensator for keeping a constant volume of liquid in the circuit of a hydraulic transmission system which comprises a bellows, two end plates mounted on said bellows, a connection on one of said end boards, a pipe connected to the circuit of the hydraulic transmission system and mounted on said connection, another bellows inclosed in the first one, two end plates mounted on said bellows so as to form a chamber which is filled with a liquid which has a greater coefficient of expansion than the liquid of the hydraulic transmission system, two threaded rods and nuts on said rods for rigidly securing the end plates of said bellows respectively together.

In testimony whereof I have signed this specification.

MAURICE CHARLES.